United States Patent [19]

Bissig et al.

[11] Patent Number: 4,843,196

[45] Date of Patent: Jun. 27, 1989

[54] MODE SWITCHING DEVICE FOR AN ELECTRICAL SWITCH

[75] Inventors: Josef Bissig, Altdorf; Peter Hilfiker, Buchs, both of Switzerland

[73] Assignee: Sprecher & Schuh AG, Aarau, Switzerland

[21] Appl. No.: 35,527

[22] Filed: Mar. 16, 1987

[30] Foreign Application Priority Data

Mar. 20, 1986 [CH] Switzerland ........................ 01132/86

[51] Int. Cl.[4] ............................................. H02B 1/08'

[52] U.S. Cl. ..................................... 200/336; 200/564

[58] Field of Search ............... 200/336, 155 R, 155 A, 200/179

[56] References Cited

U.S. PATENT DOCUMENTS 3,363,070 1/1968 Kussy .............................. 200/155 R
3,718,795 2/1973 Good .................................. 200/293
3,797,007 3/1974 Salvati et al. ........................ 335/176
3,961,145 6/1976 Halbeck .......................... 200/155 A
4,348,569 9/1982 Golbeck et al. ................ 200/155 R
4,659,889 4/1987 Kaminski et al. .................. 200/336

FOREIGN PATENT DOCUMENTS 0003497 8/1979 European Pat. Off. .
2434474 3/1980 France .
2493032 4/1982 France .

*Primary Examiner*—Renee S. Luebke
*Attorney, Agent, or Firm*—Werner W. Kleeman

[57] ABSTRACT

A mode switching or conversion device for selectively altering the operating mode of an electrical switch or other piece of equipment comprises an actuator or locking member rotatable about an axis of rotation which is disposed substantially perpendicular to the housing wall of the electrical switch. The actuator is positionally retained in an opening of this housing wall by means of a bayonet catch or joint. This actuator or locking member is provided with an axially elastic spring or resilient bracket provided with latching cams or lugs which can latch in different positions thereof into latching recesses or pockets of a latching base member of the housing.

11 Claims, 3 Drawing Sheets

MODE SWITCHING DEVICE FOR AN ELECTRICAL SWITCH

CROSS REFERENCE TO RELATED APPLICATION

This application is related to the commonly assigned copending U.S. application Ser. No. 799,934, filed Jan. 20, 1985, and entitled "Motor Protection Switch", now U.S. Pat. No. 4,686,599, granted Aug. 11, 1987.

BACKGROUND OF THE INVENTION

The present invention relates to a new and improved construction of a mode switching or conversion device for installation in the housing of an electrical switch or other appropriate component or piece of equipment and for selective switching between predetermined operative modes of the electrical switch.

To increase mass production and to simplify stock inventories it is desirable to build multi-mode electrical switches which assume different operative modes or states for performing multiple functions. In such multi-mode electrical switches it is desirable to limit its multiple functions to preselected functions of operative modes or states and the inventive mode switching or conversion device is intended to permit switching between such preselected operative modes or states and thus between preselected functions of the electrical switch.

SUMMARY OF THE INVENTION

Therefore it is a primary object of the present invention to provide a new and improved construction of a mode switching or conversion device for an electrical switch, which mode switching device is relatively simple in construction and design, small in its dimensions, and extremely easy to actuate or operate.

Another significant object of the present invention aims at the provision of a new and improved construction of a mode switching or conversion device for an electrical switch or other component or piece of equipment, and which mode switching or conversion device is both relatively simple in its construction and design, quite easy to operate or use, highly reliable in its operation, and not readily subject to breakdown or malfunction.

Now in order to implement these and still further objects of the invention, which will become more readily apparent as the description proceeds, the mode switching or conversion device of the present invention is manifested by the features that an actuator or locking member which can be operated externally or from the outside of the housing of the electrical switch or the like, is rotatably mounted in an opening in a wall of the housing such that it can be rotated about an axis of rotation which extends substantially perpendicular to the housing wall. The actuator or locking member is provided with a guide ring or guide means which cooperate or interengage with bayonet claws or bayonet elements associated with the opening in the housing wall so as to provide a bayonet-type joint or interengagement which locks the actuator or locking member for rotational movement within the opening of the housing wall. The actuator or locking member is provided with a latching or locking ring which extends in arcuate configuration around the axis of rotation of the actuator or locking member and contains spring or resilient brackets or clips. Such spring or resilient brackets or clips are axially elastic or resilient, in other words can axially elastically or resiliently move substantially in the direction of extent of the axis of rotation. A predetermined number of latching cams or lugs extend from respective ones of the spring or resilient brackets or clips and can be latched with or locked into associated latching recesses or pockets which are located in the housing wall, and constitute predetermined locking locations. Every such latching location corresponds to a predetermined rotational position of the actuator or locking member and thus to a preselected mode of operation or operative state of the electrical switch.

The actuator or locking member which can be actuated externally of the switch housing enables rapidly and simply accomplishing changes between the preselected modes of operation or operative states of the electrical switch or the like.

Since the actuator or locking member may be rotated about an axis of rotation extending substantially perpendicular to the wall of the housing, operation is greatly facilitated. Simultaneously there is prevented unintentional rotataion or operation of the actuator or locking member, particularly when, according to a preferred construction, the actuator or locking member is inset or sunk into the opening of the housing wall so as to be at least flush therewith.

Due to the bayonet-type joint or interengagement between the guide ring or guide means of the actuator or locking member and the bayonet claws or elements which are associated with the housing wall, particularly the region in the opening of the housing wall, the actuator or locking member can be inserted from the outside into the opening of the housing wall. This is particularly advantageous as concerns the assembly of the mode switching device and the related electrical switch or component or the like and even renders possible automatic assembly operations.

The latching recesses or pockets located in the wall of the housing and defining the latching locations, and the latching cams or lugs of the spring or resilient brackets or clips of the actuator or locking member, are easily manufactured. During the assembly operation, these latching recesses or pockets and the latching cams or lugs automatically engage with one another. Their number is limited only by the dimensions of the housing and the actuator or locking member so that there can exist more than two predetermined latching or locking positions of the actuator or locking member at the housing wall.

Nonetheless, the entire mode switching or conversion device has extremely small dimensions and preferably does not exceed the usual thickness of the wall of the housing.

Each one of the walls of the housing including the opening therein and the actuator or locking member may be manufactured in one piece or as a respective integrated structure or component from a suitable plastic material applying conventional precision molding techniques for plastic materials, something which offers great economical advantages.

The actuator or locking member is preferably provided with a continuous hub at whose one terminal end or side there is formed or integrated the axially elastic latching or locking ring containing the spring or resilient bracket or clips. The guide ring or guide means are formed or positioned in the central or intermediate part of this continuous hub and in spaced relationship with respect to the axially elastic latching or locking ring containing the spring or resilient brackets or clips. Thus there can be accomidated the bayonet claws or bayonet elements or the like between the axially elastic latching or locking ring and the guide ring or guide means.

Preferably, two spring or resilient brackets or clips of the latching or locking ring are disposed in a common plane opposite to one another and partially separated or spaced from the continuous hub by respective substantially arcuate-shaped windows. The diameter of the latching or locking ring corresponds to the largest diameter of the actuator or locking member. This substantially ring-shaped or annular latching or locking ring or latching means is located in the opening in the housing wall above an equally substantially ring-shaped or annular latching or locking base or bottom member. This latching or locking base or bottom member bounds the largest part of the opening in the housing wall in radially inward direction and contains the latching locations which, as previously stated, are preferably formed as latching recesses or pockets.

The latching clams or lugs of the spring or resilient brackets or clips preferably form latching projections facing the respecting latching recesses or pockets in predetermined rotational positions of the actuator or locking member. The bayonet claws or bayonet elements are preferably positioned at a location axially outwardly from the latching or locking base or bottom member and also extend radially inwardly with respect to the axis of rotation, i.e. into the opening in the housing wall These bayonet claws or elements, in fact, protrude radially inwardly such as to overly the arcuate-shaped or arc-shaped windows of the latching or locking ring of the actuator or locking member when the actuator or locking member is inserted in proper position into the opening in the housing wall. After insertion and during rotation of the actuator or locking member, the undersides of the bayonet claws or elements are in sliding engagement with the top sides of respective parts of the guide ring or guide means of the actuator or locking member. The guide ring or guide means possesses a smaller diameter than the latching or locking ring of the actuator or locking member. The underside of the guide ring or guide means upon a guide bears base or bottom which axially inwardly bounds the intermediate sector or region of the opening in the housing wall.

As a result of such rotataion of the actuator or locking member, there is thus obtained a stable position of the actuator or locking member in axial direction Insertion of the actuator or locking member from the outside into the opening in the wall of the switch housing is greatly facilitated due to the specific structures of the actuator or locking member and the housing wall.

In order to further simplify the assembly or mounting of the actuator or locking member in the opening of the housing wall and to simultaneously prevent the assembled or mounted actuator or locking member from being easily rotatably disconnected or dismantled from the opening in the wall of the housing, the latching or locking base or bottom member contains, in addition to, the latching locations, limit or terminal stops. These limit or terminal stops serve as stops or abutments bounding the latching locations, namely the latching recesses or pockets receiving the respective latching cams or lugs of the respective spring or resilient brackets or clips during rotation of the actuator or locking member. These limit or terminal stops may be designed as steep flanks or portions at one circumferential side of the respective latching recess or pocket. At the opposite circumferential ends, the latching recesses or pockets may be bounded by a sloped portion or ramp. Consequently, after insertion and during rotation of the actuator or locking member, the latching cams or lugs of the spring or resilient brackets or clips can travel over the sloped portions or ramps in one direction of rotation of the actuator or locking member. The limit or terminal stops, namely the steep flanks or portions, however, prevent rotation of the actuator or locking member in the opposite direction due to their engagement with the latching cams or lugs.

Preferably and advantageously the latching or locking base or bottom member contains at least one partially ring-shaped or annular groove which is enlarged at discrete locations by the latching locations, namely the latching recesses or pockets bounded at opposite circumferential ends as described hereinabove.

The opening in the housing wall preferably possesses at its innermost location, a section or region of smallest diameter and in this section or region there is seated the axially innermost portion of the continuous hub. This axially innermost portion contains a centering part or device which centers the actuator or locking member and also effectivel obturates or seals the opening of the housing. Basically, the innermost section or region constitutes an opening which is, as circular or round as possible in order to effectively fulfill its centering and closing or sealing function. However, for the easy construction of the bayonet claws or bayonet elements, it may be necessary to provide recesses therein for receiving a forming tool. Such recesses, in turn, are closed by the guide ring or guide means of the actuator or locking member.

The axially outer terminal end or side of the continuous hub max contain an application or engagement location or facility for receiving a tool, such as, for instance, a screwdriver. In this way, there can be prevented any unintentional manipulation of the actuator or locking member particularly if the latter is completely inserted or sunk into the wall of the housing.

At the axially innermost or inner terminal end or side, the actuator or locking member contains an operating or actuating projection or operating element or equivalent structure, for instance, an eccentric pin or pin member or the like which protrudes into the interior of the housing of the switch. Such operating or actuating projection or operating element actually effects the mode switching or conversion of the electrical switch, i.e. the switching between predetermined operative modes or states of the electrical switch, upon appropriately rotating the actuator or locking member. This operating or actuating projection or operating element, for example, eccentric pin or the like renders possible for instance, after the electrical switch has been tripped, different operative modes or states for release from the tripped position, depending upon the adjustment or rotational position of the actuator or locking member. Obviously, other types of operation or function can also be controlled in a corresponding manner by utilizing the inventive mode switching device.

In the inventive mode switching device, the actuator or locking member thus is inserted from the outside into the opening in the housing wall and is secured therein through the use of the bayonet-type joint or interengagement in a manner such that there can be carried out the aforedescribed rotatational movements for performing the desired switching through which the actuator or locking member is inserted into modes of the electrical switch or the like.

In view of the foregoing, the present invention offers the following advantages:

The mode switching or conversion device may be utilized with a number of different electrical switches, for example, motor protective switches, line protective switches and power switches.

The actuator or locking member possesses a very snug or compact construction and may be formed in a simple manner from plastic material. Thus, the entire actuator or locking member of the mode switching or conversion device, is accommodated within the thickness of the wall of the switch housing and only its operating or actuating projection or operating element protrudes into the interior space of the switch housing. Furthermore, such actuator or locking member seals-off or closes the switch housing particularly in the region of the opening in the wall through which the actuator or locking member is inserted into the switch housing.

The actuator or locking member is inserted through the opening in the wall of the switch housing from the exterior, which allows for a very simple mounting of the actuator or locking member.

The wall of the housing need only be provided with an appropriately configured opening correlated in shape to that of the actuator or locking member. This can be easily accomplished during the course of the fabrication of the housing wall from plastic material.

The herein described mode switching or conversion device also can be adapted to linear motion in a very simple way. Therefore, the actuator or locking member is constructed as a slide or slide member carrying a spring or resilient bracket which extends parallel to the direction of motion of the slide or slide member. The housing wall is then constructed with bayonet claws or elements extending substantially parallel to the direction of movement of the slide or slide member.

BRIEF DESCRIPTION OF THE DRAWING

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
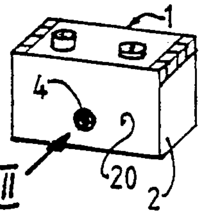
FIG. 1 schematically illustrates in perspective view and on a reduced scale, an electrical switch incorporating an exemplary embodiment of the mode switching or conversion device according to the present invention.

Describing now the drawings, it is to be understood that to simplify the showing thereof, only enough of the structure of the mode switching or conversion device and the related electrical switch or other associated component or equipment has been illustrated therein as is needed to enable one skilled in the art to readily understand the underlying principles and concepts of the present invention. Turning now specifically to FIG. 1 of the drawings, the apparatus or device illustrated therein by way of example and not limitation will be seen to comprise a mode switching or conversion device for an electrical switch 1 which is provided with a housing 2 comprising a number of housing walls, wherein one housing wall 20 is provided with an opening 3 in which an actuator or locking member 4 may be inserted and mounted for selective rotational movement for switching the operating modes of the electrical switch 1.

Figure 3:
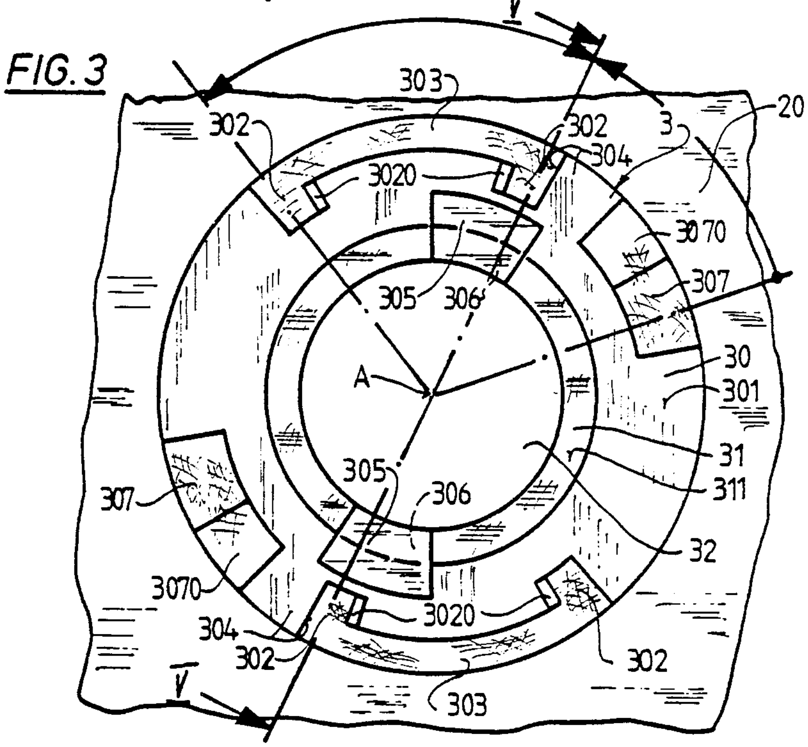
FIG. 3 schematically illustrates in a view as shown in FIG. 2, the part of the wall of the housing of the electrical switch in the absence of the actuator or locking member.
Figure 5:
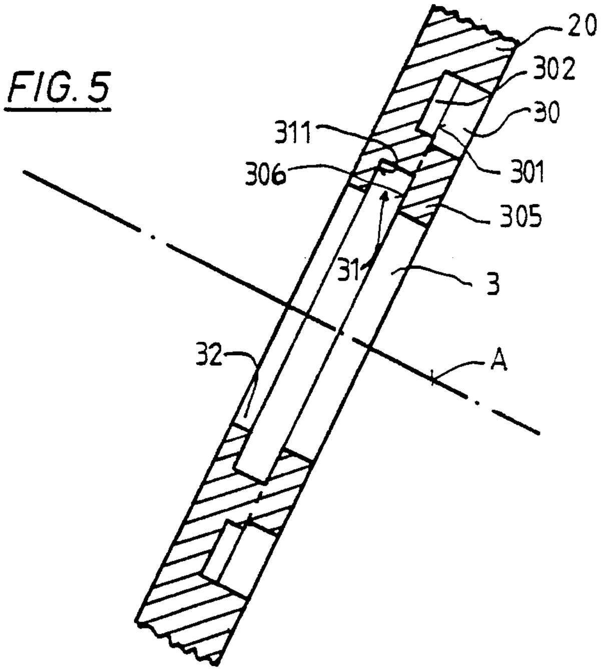
FIG. 5 shows a section taken along the line V—V in FIG. 3.

According to the showing of the drawings, particularly FIGS. 3 and 5, the house opening 3 comprises three different superimposed sectors or regions 30, 31 and 32 possessing different diameters or sizes. The sector or region of the housing opening 3 with the greatest diameter, as generally indicated by reference character 30, and provided in the housing wall 20, is located in the outermost part or exterior side of the housing wall 20. The sector or region of the housing opening 3 of the housing wall 20 provided with the intermediate diameter or intermediate size opening in its central part has been generally designated with reference numeral 31, and the sector or region of the housing opening 3 provided with the smallest diameter or smallest size opening and located in the innermost part or interior region of the housing wall 20 has been generally designated with reference numeral 32. According to the showing of FIGS. 3 and 5, the intermediate size sector 31 forms a latching base member 301 and contains at least two diametrically situated subsequently ring-shaped or arcuate grooves 303 on each of whose terminal ends, the latching recesses or pockets 302 are positioned. These latching recesses or pockets 302, in turn, are provided on one side with a sloped portion or ramp 3020 as best seen by referring to FIGS. 3 and 6 (position 63). The rotating movement of the actuator or locking member 4 along these ring-shaped or arcuate grooves 303 is restricted by the limit or terminal stops 304 in the form of steep portions or flanks.

Figure 2:
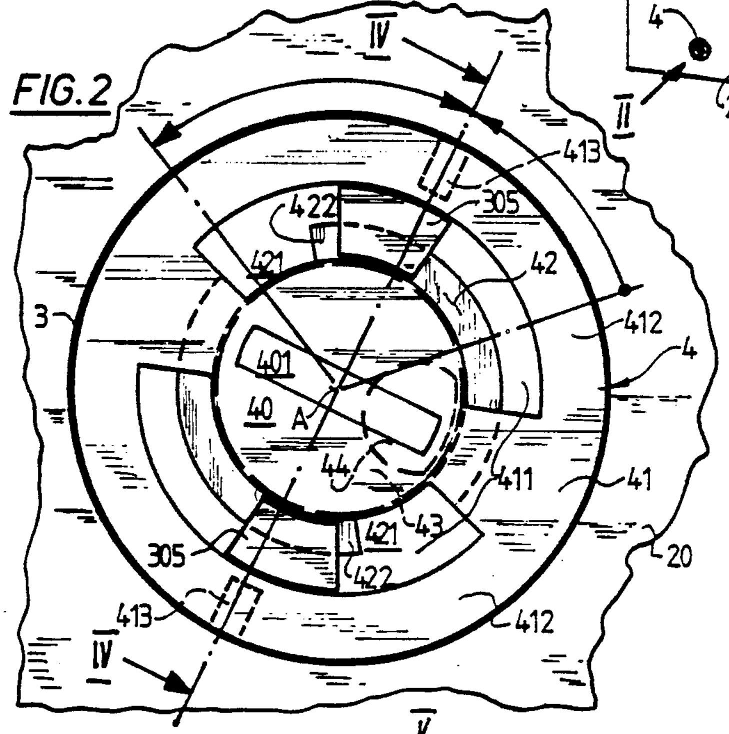
FIG. 2 schematically illustrates in a plan view and on an enlarged scale, a part of the wall of the housing of the electrical switch containing an actuator or locking member of the inventive mode switching or conversion device, as viewed in the direction of the arrow II in FIG. 1.
Figure 4:
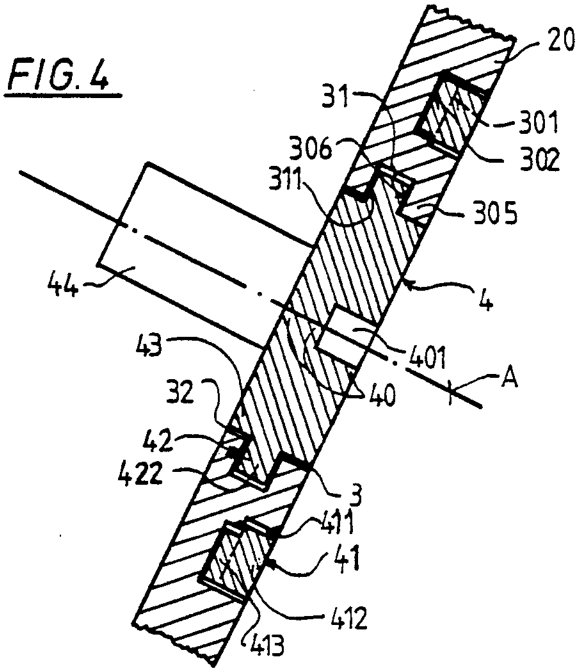
FIG. 4 shows a section taken along the line IV—IV in FIG. 2.

According to FIGS. 2 and 4, the actuator or locking member 4 is provided with a hub or nave 40 comprising a latching or locking ring 41 provided at the region of the outer terminal end or outermost terminal region of the hub 40, a guide or guiding ring or guide means 42 arranged at the intermediate region or portion of the hub 40 of the actuator or locking member 4, a substantially cylindrical centering part or element 43 located at the innermost portion or inner end or end region of the hub 40, and an operating or actuating projection or operating element 44 which may be eccentrically arranged at the actuator or locking member 4. These parts are arranged in this order or sequence in the housing opening 3 of the wall 20 of the electrical switch 1. A manipulating opening or facility for the actuator or locking member 4, here shown as a manipulating slot 401 for receiving a suitable operating or actuating tool, such as a screwdriver, is formed in the external part or outer terminal end of the hub or nave 40. By means of this manipulating slot or slot 401 and when there is inserted therein a screwdriver or the like, the actuator or locking member 4 may be selectively rotated or turned about the rotational axis A. This rotatational axis A of the actuator or locking member 4 extends substantially perpendicular to the housing wall 20 of the electrical switch 1.

The latching or locking ring 41 is positioned at the outermost part of the hub 40 of the actuator or locking member 4. This latching or locking ring or latching element 41 is provided with at least two substantially ring-shaped or arcuate-shaped windows 411 as well as with several spring brackets or clips 412 which circumferentially bound the associated ring-shaped or arcuate-shaped windows 411 as shown in FIG. 2. Each of the spring brackets or clips 412 is provided with at least one suitable latching location or facility here constituted by an associated latching cam or lug 413. These latching cams or lugs 413 can be selectively brought into engagement with various ones of the latching recesses or grooves or pockets 302 of the latching base member 301 for selectively latching or locking the actuator or locking member 4 in a desired rotational position depending upon the intended mode of operation of the associated electrical switch 1.

As previously explained, the guide or guiding ring or guide means 42 is positioned at the intermediate or central part or portion of the hub 40 and is provided with at least two substantially ring-shaped or arcuate openings 421 which separate or subdivide the guide ring or guide means 42 into different parts 422.

Figure 6:
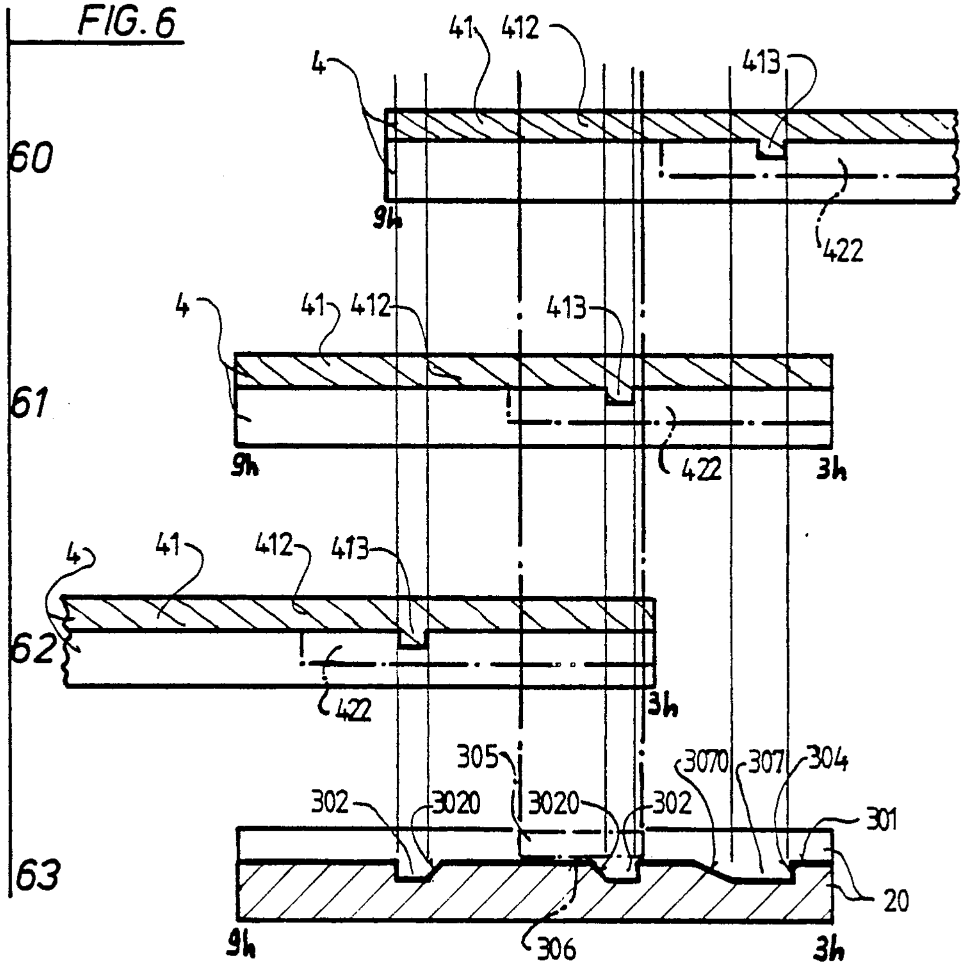
FIG. 6 shows a number of superimposed development views.
Figure 7:
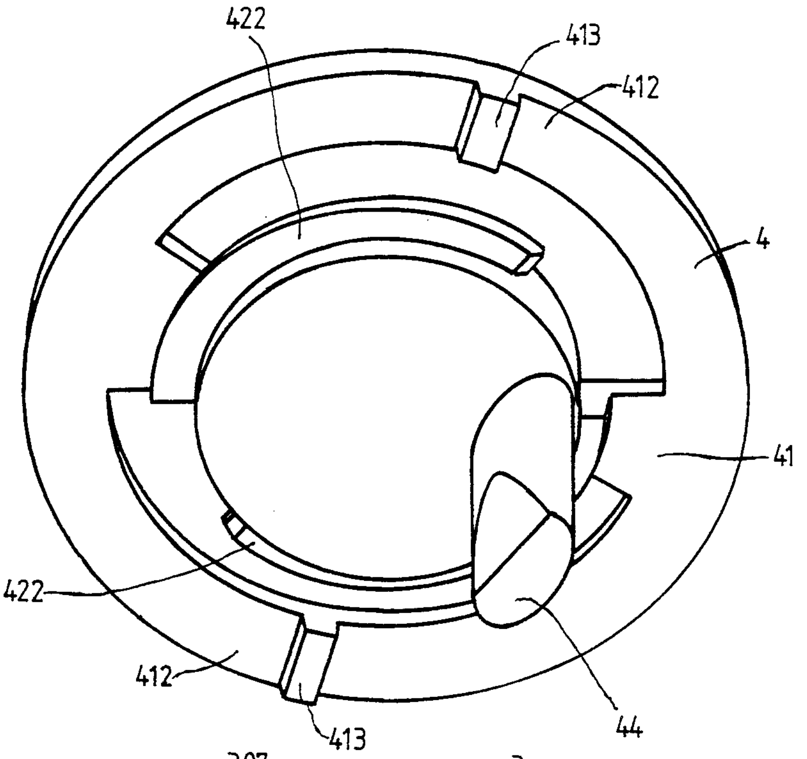
FIG. 7 is a perspective bottom view of the actuator or locking member shown in FIG. 2.
Figure 8:
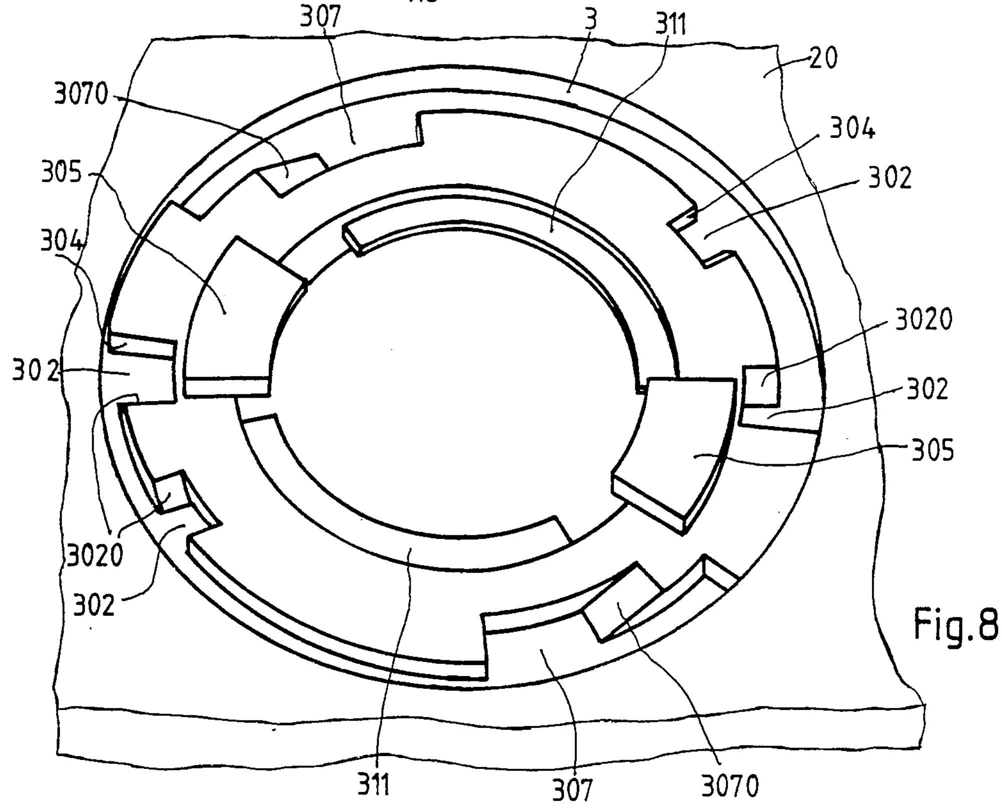
FIG. 8 is a perspective top view of the part of the wall of the housing of the electrical switch as shown in FIG. 3.

By referring now to FIG. 6 there will be recognized in the lowermost development view, indicated at position 63, part of the opening of the housing wall 20 at the region of the latching base member or bottom portion 301 which is equipped with two latching recesses or pockets 302, a terminal stop 304 and one insert trough or depression 307 for insertion of the actuator or locking member 4 into the housing opening 3 and a sectional view of the material lying therebetween. This development view at position 63 in the showing of FIG. 6 extends through an angle from the 9 o'clock position to the 3 o'clock position in clockwise direction of the showing of FIG. 3. The position of a bayonet claw or bayonet element 305 is indicated by a chain-dotted line. Above position 63 of FIG. 6, there are shown development views of the associated parts of the actuator or locking member 4, representing angle areas or sweeps of such development views extending in FIG. 2 from the 9 o'clock position to the 3 o'clock position in the inserting position (position 60 in FIG. 6) and in both latching or lock-in positions (positions 61 and 62 in FIG. 6) of the actuator or locking member 4. The depicted guide ring portion or part 422 of the guide ring or guide means 42 has been indicated by a chain-dotted line.

Directing attention now further to FIG. 6 of the drawings, the acuator or locking member 4 is inserted into the opening 3 of the housing wall 20 of the electrical switch 1 in the following manner.

The actuator or locking member 4 is partially introduced in axial direction into the housing opening 3. Now the actuator or locking member 4 is rotated about the rotational axis A in anticlockwise or counterclockwise direction until the openings 421 between the parts 422 of the guide ring 42 are exactly positioned above the bayonet claws or bayonet elements 305 protruding radially inwardly from the region of the largest size sector 30 of the housing wall 20.

Now the actuator or locking member 4 may be completely axially introduced into the housing opening 3 of the housing wall 20 of the electrical switch 1 and the bayonet claws or bayonet elements 305 pass through the openings 421 of the guide ring or guide means 42 and enter into the windows 411.

At this point in the assembly operation, the actuator or locking member 4 may be further rotated in the anticlockwise or counterclockwise direction around the rotational axis A. During this operation the parts 422 of the guide ring or guide means 42 bear upon the guide base or bottom which bounds the lower side of the intermediate sector or region 31 of the opening in the housing wall 20 and slide underneath the holding surfaces 306 of the bayonet claws or bayonet elements 305, see FIGS. 2 and 4.

Upon further rotation of the actuator or locking member 4 about the rotational axis A in anticlockwise direction, the latching cams or lugs or latching elements 413 slide along the sloped portions or ramps 3070 of the respective insert troughs or depressions 307 and across the circumferentially adjacent limit or terminal stops 304 into the respective circumferentially following latching recesses or pockets 302. During this movement, the spring or resilient brackets or clips 412 of the latching or locking ring or latching element 41 are axially deflected in outward direction and, at the end of this movement, spring-back inwardly into their initial or starting position. This end position of the rotating movement is shown by positions 61 and 63 of FIG. 6 and also indicated in FIGS. 2 to 5. The actuator or locking member 4 cannot be rotated in clockwise direction out of this rotational end position, which is reached at the end of the insertion operation of the actuator or locking member 3 because the related limit or terminal stops 304, due to their steep flanks, do not allow such clockwise rotation of the latching cams or lugs 413 Consequently, the actuator or locking member 4 is secured against clockwise rotation and unintentional axial removal from the opening 3 in the wall 20 of the housing 2 of the electrical switch 1.

Such removal would be possible only after axially outwardly deflecting the latching cams or lugs 413 out of engagement with their respective latching recesses or pockets 302 by means of an appropriate tool and clockwise rotation for realignment of the openings 421 and the respective bayonet elements.

The actuator or locking member 4 can be further rotated in the anticlockwise or counter clockwise direction in order to assume an other rotational position represented by the positions 62 and 63 in FIG. 6. During such rotational movement, the latching cams or lugs 413 slide over the sloped portions or ramps 3020 out of engagement with the associated latching recesses or pockets 302 and then latch into the following circumferenetially respective latching recesses or pckets 302. As a result, the respective spring or resilient brackets or clips 412 are subject to an axially outwardly directed deflection.

Rotation of the actuator or locking member 4 in the clockwise direction will return the same into the aforementioned latched or locking position. In this manner, the inventive mode switching device, specifically the actuator or locking member 4, can be selectively and easily switched back and forth in both rotational directions.

To simplify the description, only two latching positions or locations of the actuator or locking member 4 have been shown in the drawings and described in detail hereinbefore. It is to be understood, however, that the invention is not limited to these two positions, but further latching positions or locations can provided in corresponding manner, if desired.

As a consequence of the rotational movement of the actuator or locking member 4 between the aforedescribed two latching positions or locations, the operations or actuating projection or operating element 44, which is, for instance, eccentrically attached or formed at the substantially cylindrical centering part or element 43, performs an eccentric rotating movement inside the electrical switch 1. Such eccentric rotating movement of the operating or actuating projection or operating element 44 is utilized for selective mode switching or switching between respective operative modes or states of the associated electrical switch 1 or other related component or piece of equipment.

While there are shown and described present preferred embodiments of the invention, it is to be distinctly understood that the invention is not limited thereto, but may be otherwise variously embodied and practiced within the scope of the following claims.

Accordingly, what we claim is:

1. An electrical device containing an electrical switch and mode switching means for switching between a plural number of operative modes of the electrical switches, said device comprising:

a housing of the electrical switch;

said housing including a housing wall containing an opening;

a plural number of latching means located at said housing wall in the region of said opening;

said plural number of latching means being arranged in circumferentially mutually spaced relationship;

said plural number of latching means defining a plural number of latching locations each of which is associated with a selected one of the plural number of operative modes of the electrical switch;

a plural number of bayonet claws located at said housing wall and partially extending into said opening substantially in radial direction;

an actuator member mounted in said opening of said housing wall of said electrical switch for rotation about an axis of rotation which extends substantially perpendicular to said housing wall;

said actuator member containing guide ring means interengaged with said bayonet claws or said housing wall and forming a bayonet joint;

said actuator member further containing resilient bracket means extending in substantially arcuate configuration about said axis of rotation of said actuator member;

said resilient bracket means being axially resilient for reversible displacement in a direction of extent of said axis of rotation;

a plural number of latching elements located at said resilient bracket means of said actuator member;

said plural number of latching elements being arranged in circumferentially mutually spaced relationship;

said plural number of latching elements located at said resilient bracket means of said actuator member and said plural number of latching means located at said housing wall having mutually substantially complementary shapes;

at least one operating projection protruding from said actuator member into the interior space of said electrical switch; and said at least one operating projection, in each rotary position of said actuator member and in which rotary position one of said plural number of latching elements of said actuator member is interengaged with one of said plural number of latching means of said housing wall, acting upon said electrical switch and tbereby placing said electrical switch into said selected operative mode.

2. The electrical device as defined in claim 1, wherein:

said plural number of latching means located at said housing wall and defining said plural number of latching locations, constitute latching recesss.

3. The electrical device as defined in claim 1, wherein:

said actuator member constitutes a one-piece actuator member;

a hub of said actuator member has an axially outermost end region and an axially intermediate region;

said axially resilient bracket means is located at said axially outermost end region of said hub; and said guide ring means is located at said axially intermediate region of said hub.

4. The electrical device as defined in claim 3, wherein:

said axially resilient bracket means of said actuator member comprise a latching ring containing a plural number of axially resilient brackets;

said latching ring is arranged in a radially spaced relationship with respect to said hub;

said plural number of axially resilient brackets are positioned substantially in a common plane and partially radially spaced from said hub by substantially arcuate-shaped windows;

said opening in said housing wall has a largest size region and an intermediate size region;

a latching base member of said housing wall is located in said largest size region of said opening and equipped with said plural number of latching means;

said latching base member of said housing wall axially inwardly bounds said largest size region of said opening;

said plural number of bayonet claws is located at a region of said latching base member;

a guide base member of said housing wall and which guide base member axially inwardly bounds said intermediate size region of said opening;

said plural number of bayonet claws located at said region of said latching base member of said housing wall protrude axially outwardly through respective ones of said substantially arcuate-shaped windows in said latching ring of said actuator member and radially extend over said guide ring means of said actuator member;

said latching ring of said actuator member is inset into said largest size region of said opening in said housing wall; and said guide ring means of said actuator member bear upon said guide base member of said housing wall.

5. The electrical device as defined in claim 4, wherein:

said plural number of axially resilient brackets of said actuator member carry said plural number of latching elements;

said latching base member of said housing wall further comprises a plural number of limit means constituting limit stops for said latching elements of said axially resilient brackets during said rotation of said actuator member; and said limit stops of said housing wall are overrun by the latching elements of the axially resilient brackets of said actuator member only during rotation of the actuator member upon assembly of the acutator member and said housing wall.

6. The electrical device as defined in claim 5, wherein:

said latching base member of said housing wall contains a plural number of substantially arcuate grooves; and said latching means and said limit stops being located at said arcuate grooves.

7. The electrical device as defined in claim 6, wherein:

said opening of the housing wall having a smallest size region;

a hub of said actuator member having an axially innermost end region;

said axially innermost end region constituting a substantially cylindrical centering element; and said substantially cylindrical centering element being inset into said smallest size region of the opening in the housing wall.

8. The electrical device as defined in claim 7, wherein:

said axially outermost end region of said hub of said actuator member contains a manipulating element for engagement with a tool for rotating said actuator member about its axis of rotation.

9. The electrical device as defined in claim 1, wherein:

a hub of said actuator member has an axially innermost end region;

said at least one operating projection extends from said axially innermost end region of said hub; and said at least one operating projection being eccentrically located at said hub.

10. The electrical device as defined in claim 9, wherein:

said actuator member being inserted into said opening in the housing wall and locked in said opening of the housing wall by means of the bayonet joint formed between said bayonet claws located at the housing wall, and said guide ring means of said actuator member.

11. An electrical device containing mode switching means for switching between preselected modes of operation of the electrical device, said electrical device comprising:

a housing containing said electrical device;

said housing including a housing wall containing an opening;

latching means located at said housing wall and defining latching locations;

each one of said latching locations corresponding to one of the preselected modes of operation of the electrical device;

bayonet means located at said housing wall and partially extending into said opening;

an actuator member for external operation and movably mounted in said opening of said housing wall of said electrical device;

said actuator member containing engagement means interacting with said bayonet means located at said housing wall in order to form a bayonet lock;

said actuator member containing an axially innermost region and at least one operating projection eccentrically extending from said axially innermost region;

said actuator member comprising axially resilient bracket means; and said axially resilient bracket means containing latching elements for latching with said latching means located at said housing wall at said latching locations so that said actuator member can be latched in selective ones of said latching locations within said opening in the housing wall.

* * * * *

UNITED STATES PATENT AND TRADEMARK OFFICE
CERTIFICATE OF CORRECTION

PATENT NO. : 4,843,196

DATED : June 27, 1989

INVENTOR(S) : JOSEF BISSIG et al.

It is certified that error appears in the above-identified patent and that said Letters Patent is hereby corrected as shown below:

Column 2, line 22, please delete "rotataion" and insert --rotation--

Column 3, line 3, please delete "accomidated" and insert --accommodated--

Column 3, line 22, please delete "clams" and insert --cams--

Column 3, line 24, please delete "respecting" and insert --respective--

Column 3, line 47, please delete "rotataion" and insert --rotation--

Column 4, line 36, please delete "max" and insert --may--

Column 7, line 10, please delete "rotatational" and insert --rotational--

Column 8, line 18, after "bottom" please insert --311--

Column 8, line 55, after "or" please delete "counter"

Column 8, line 62, please delete "renetially" and insert --rentially--

UNITED STATES PATENT AND TRADEMARK OFFICE
CERTIFICATE OF CORRECTION

PATENT NO. : 4,843,196

DATED : June 27, 1989

INVENTOR(S) : JOSEF BISSIG et al

It is certified that error appears in the above-identified patent and that said Letters Patent is hereby corrected as shown below:

Column 9, line 10, after "can" please insert --be--

Column 9, line 15, please delete "tions" and insert --ting--

Column 10, line 15, please delete "tbereby" and insert --thereby--

Column 10, line 21, please delete "recesss" and insert --recesses--

Signed and Sealed this

Twenty-ninth Day of May, 1990

*Attest:*

HARRY F. MANBECK, JR.

*Attesting Officer* *Commissioner of Patents and Trademarks*